US012565088B2

(12) United States Patent
Dylewski, II et al.

(10) Patent No.: US 12,565,088 B2
(45) Date of Patent: Mar. 3, 2026

(54) TONNEAU COVERS

(71) Applicant: Leer Group, Elkhart, IN (US)

(72) Inventors: Eugene A. Dylewski, II, Granger, IN (US); Michael A. Sislo, Dexter, MI (US)

(73) Assignee: Leer Group, Elkhart, IN (US)

( * ) Notice: Subject to any disclaimer, the term of this patent is extended or adjusted under 35 U.S.C. 154(b) by 418 days.

(21) Appl. No.: 18/172,459

(22) Filed: Feb. 22, 2023

(65) Prior Publication Data

US 2023/0264548 A1      Aug. 24, 2023

Related U.S. Application Data

(60) Provisional application No. 63/313,464, filed on Feb. 24, 2022.

(51) Int. Cl.
B60J 7/14 (2006.01)
B62D 29/04 (2006.01)
B60J 7/19 (2006.01)

(52) U.S. Cl.
CPC ............ B60J 7/141 (2013.01); B62D 29/043 (2013.01); *B60J 7/198* (2013.01)

(58) Field of Classification Search
CPC ..... B60J 7/041; B60J 7/062; B60J 7/14; B60J 7/141; B60J 7/16; B60J 7/1607
USPC ............ 296/100.02, 100.03, 100.06, 100.09, 296/100.12
See application file for complete search history.

(56) References Cited

U.S. PATENT DOCUMENTS

| | | | | |
|---|---|---|---|---|
| 5,203,603 A | * | 4/1993 | Hertzberg | ................ B60J 7/041 296/100.03 |
| 6,832,803 B2 | | 12/2004 | Elliott | |
| 7,404,586 B2 | * | 7/2008 | Seiberling | ................ B60J 7/067 296/100.1 |
| 8,474,896 B2 | * | 7/2013 | Ostberg | ............. B62D 33/0273 296/37.6 |
| 8,783,755 B2 | * | 7/2014 | Sinkauz | ................... B60J 7/026 296/100.09 |
| 10,894,466 B2 | * | 1/2021 | Kramer | .................... B60J 7/026 |
| 11,505,048 B2 | * | 11/2022 | King | ...................... B60J 7/1204 |
| 2021/0016646 A1 | | 1/2021 | Dylewski, II | |
| 2021/0155086 A1 | | 5/2021 | Pattabhiraman et al. | |

(Continued)

FOREIGN PATENT DOCUMENTS

| | | | | | |
|---|---|---|---|---|---|
| DE | 202019106766 U1 | * | 12/2019 | .............. | B60J 7/141 |
| WO | 2018/018962 A1 | | 2/2018 | | |

OTHER PUBLICATIONS

Statement of Admitted Prior Art executed by Gene Dylewski at Leer Group on Jun. 21, 2023.

(Continued)

*Primary Examiner* — Jason S Daniels
(74) *Attorney, Agent, or Firm* — Barnes & Thornburg LLP

(57) ABSTRACT

A tonneau cover that includes a cover that selectively shrouds at least a portion of a cargo box opening is provided. The cover includes at least one panel section configured to extend over the cargo box opening. The at least one panel section is movable with respect to the cargo box opening. The at least one panel section also includes a generally planar body. At least a portion of the generally planar body of the at least one panel section is composed of a material that allows light to pass through at least this portion of the generally planar body.

18 Claims, 9 Drawing Sheets

(56)        References Cited

U.S. PATENT DOCUMENTS

| 2022/0242211 A1 | 8/2022 | Cruckshank | |
|---|---|---|---|
| 2023/0234430 A1* | 7/2023 | Wells ........................ | B60J 7/062 |
| | | | 296/100.12 |

OTHER PUBLICATIONS

Unistrut Stud, Google, Undated.
European Search Report 24166034.9-1009 / 4371860; Leer Group; Dated Jun. 4, 2024.
International Search & Written Opinion; Date of Mailing May 16, 2023; PCT/US2023/013685; Leer Group; "Tonneau Covers".

* cited by examiner

TONNEAU COVERS

RELATED APPLICATIONS

The present Application relates to and claims priority to U.S. Provisional Patent Application, Ser. No. 63/313,464, filed on Feb. 24, 2022. The subject matter disclosed in that Provisional Application is hereby expressly incorporated into the present Application.

TECHNICAL FIELD AND SUMMARY

The present disclosure relates to pickup trucks and truck beds or cargo boxes, and, in particular, cargo box covers also known as tonneau covers, used on such cargo boxes that include new features.

Tonneau covers are truck bed or cargo box covers that provide a covering for a truck bed when used in combination with the truck's sidewalls and tailgate. Covering the bed of a pickup truck helps create a secure compartment where items may be stored out of view when the tailgate is in an upward and latched position. Embodiments of a tonneau cover may include the cover portion that is suspended over the truck bed between the sidewalls. Also, a rail assembly may be employed that attaches to the opposing sidewalls to secure the cover onto the truck.

An illustrative embodiment of the present disclosure provides a tonneau cover comprising a cover that selectively shrouds at least a portion of a cargo box opening. The cover includes: at least one panel section configured to extend over the cargo box opening. The at least one panel section is movable with respect to the cargo box opening. The at least one panel section also includes a generally planar body. At least a portion of the generally planar body of the at least one panel section is composed of a material that allows light to pass through at least this portion of the generally planar body.

In the above and other embodiments, the tonneau cover may further comprise: the at least the portion of the generally planar body that allows light to pass through is transparent or translucent; the at least the portion of the generally planar body that allows light to pass through is transparent; the at least the portion of the generally planar body that allows light to pass through is translucent; an entirety of the generally planar body allows light to pass through; multiple panel sections, each with a generally planar body, is composed of a material that allows light to pass through at least this portion of the generally planar body; the cover is a fold-up cover; the cover is a roll-up cover; the at least one panel section is a single panel; the at least a portion of the generally planar body of the at least one panel section is composed of a polycarbonate that allows light to pass through at least this portion of the generally planar body; the at least a portion of the generally planar body of the at least one panel section is composed of a plastic that allows light to pass through at least this portion of the generally planar body; the at least a portion of the generally planar body of the at least one panel section is composed of a plastic that allows light to pass through at least this portion of the generally planar body; and the at least a portion of the generally planar body of the at least one panel section does not include a honeycomb core.

Another illustrative embodiment of the present disclosure provides a tonneau cover comprising a cover that selectively shrouds at least a portion of a cargo box opening. The cover includes at least one panel section that is configured to extend over the cargo box opening. The at least one panel section is movable with respect to the cargo box opening. The at least one panel section includes a generally planar body. At least a portion of the generally planar body of the at least one panel section is transparent.

In the above and other embodiments, the tonneau cover may further comprise: the cover being selected from the group consisting of a fold-up cover, a roll-up cover, and the at least one panel section being a single panel; the at least a portion of the generally planar body of the at least one panel section is composed of a polycarbonate; and the at least a portion of the generally planar body of the at least one panel section is composed of a polymer.

Another illustrative embodiment of the present disclosure provides a tonneau cover comprising a cover that selectively shrouds at least a portion of a cargo box opening. The cover includes at least one panel section that is configured to extend over the cargo box opening. The at least one panel section is movable with respect to the cargo box opening. The at least one panel section includes a generally planar body. At least a portion of the generally planar body of the at least one panel section is at least translucent.

In the above and other embodiments, the tonneau cover may further comprise: the cover being selected from the group consisting of a fold-up cover, a roll-up cover, and the at least one panel section being a single panel; and the at least a portion of the generally planar body of the at least one panel section is composed of a polycarbonate.

Additional features and advantages of the tonneau covers will become apparent to those skilled in the art upon consideration of the following detail description of the illustrated embodiments exemplifying carrying out the tonneau covers as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Corresponding reference characters indicate corresponding parts throughout the several views. The exemplification set out herein illustrates embodiments of the tonneau covers, and such exemplification is not to be construed as limiting the scope of the tonneau covers in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

See-Through Tonneau Cover Panels

An illustrative embodiment of the present disclosure includes a see-through tonneau cover. Here, individual folding or rolling panel sections may be constructed from a see-through material such as polycarbonate or other like polymer, for example, to provide a level of transparency (and/or translucency). Depending on the type of cargo box, particularly in relation to the rear window of the cab section, the see-through panel sections in either instance—unfolded flat or folded upright, allow at least some level of visibility therethrough.

Figure 1:
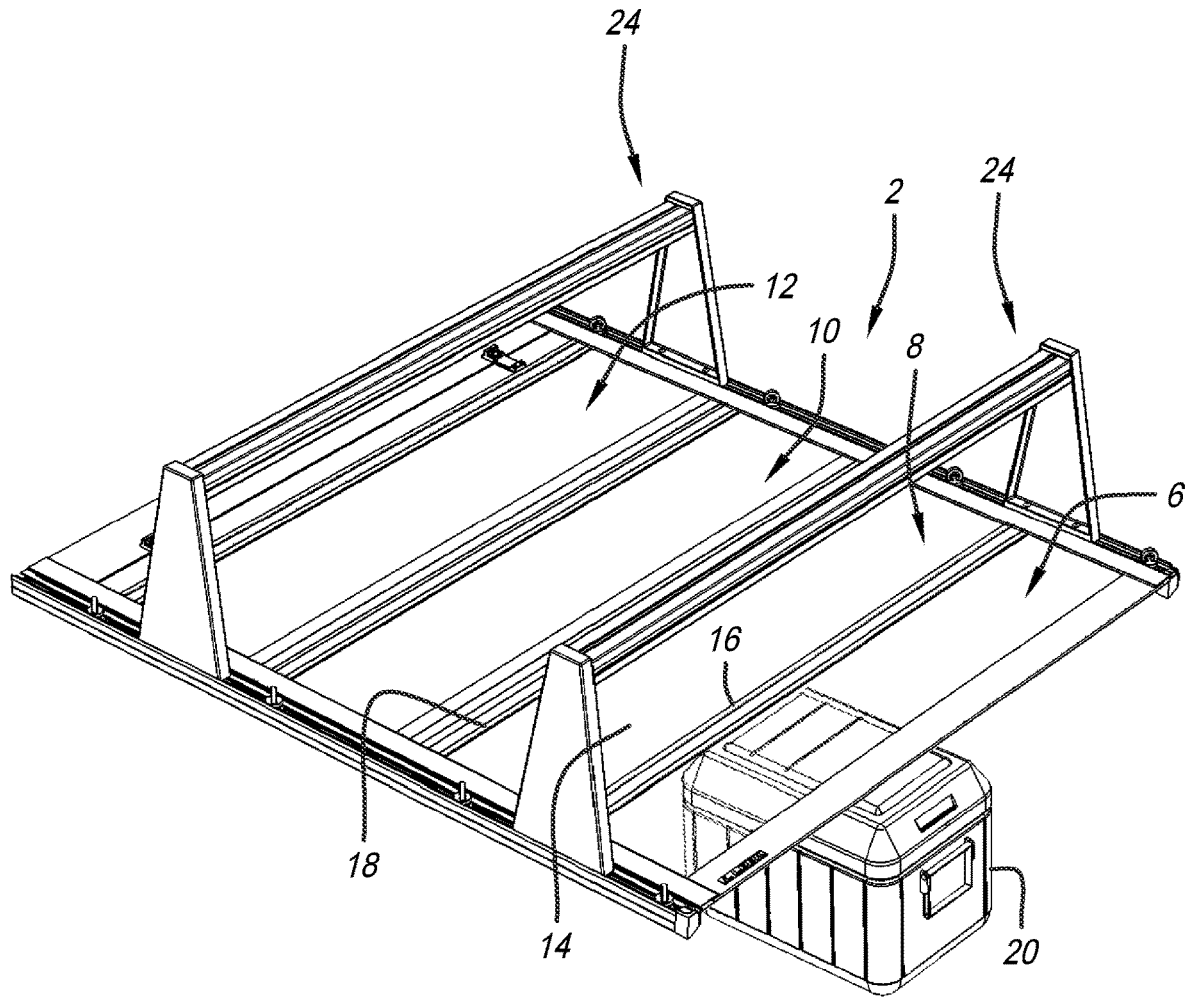
FIG. 1 is a perspective view of a folding see-through tonneau cover.
Figure 2:
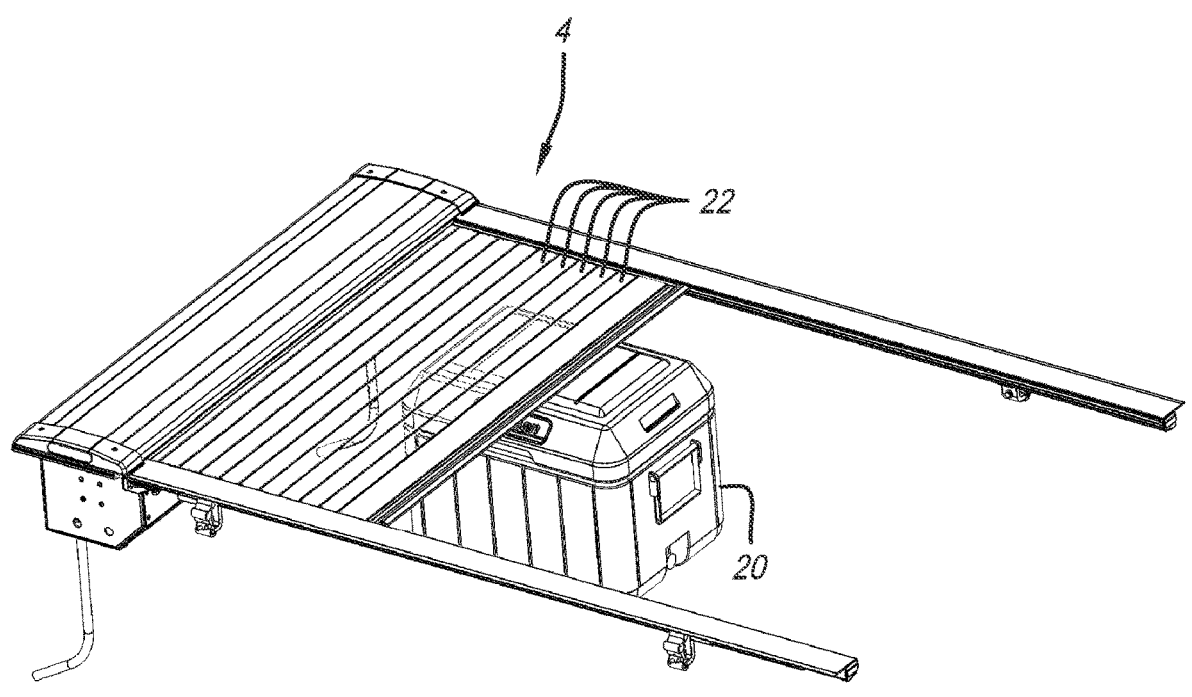
FIG. 2 is a perspective view of a roll-up see-through tonneau cover.

Perspective views of see-through tonneau covers 2 and 4 are shown in FIGS. 1 and 2. Tonneau cover 2, shown in FIG. 1, is a hard folding cover with transparent or translucent folding panels 6, 8, 10, and 12. It is appreciated that the number of transparent or translucent folding panels is illustrative. It is contemplated that there can be as few as one panel or as many as desired to fold and unfold over the cargo box. Each of the folding panels in the illustrated embodiment may include a transparent or translucent central panel 14 bounded by frame members including rear and front members 16 and 18, respectively. Side frame members are not shown in this view but extend from rear frame member 16 and front frame member 18.

It is appreciated that one or more central panels 14 may be transparent or translucent. An accessory 20 is positioned underneath panel 6 to illustrate this property. Such panels may be made of polycarbonate or some other polymer sufficient for panel construction that allows light to pass therethrough. Typically, such panels are a composite of a honeycomb substrate bounded by top and bottom sheets made of either fiberglass or metal. In an embodiment in this disclosure, there is no honeycomb core bounded by separate, nontransparent or translucent sheets.

In some embodiments, less than all of the central panels of the cover may be transparent or translucent with the other central panels being made of a conventional nontransparent material. In other embodiments, all of the central panels may be transparent or translucent. In still further embodiments, the level of transparency or translucency may be increased or decreased on each panel, based on the panel material used.

The perspective view of the see-through tonneau cover 4 in FIG. 2 shows a roll-up type cover that includes transparent or translucent slats or laths 22. Like the embodiment in FIG. 1, this roll-up tonneau cover 4 may include transparent or translucent laths 22 of varying number. For example, in one embodiment all of the laths 22 may be transparent or translucent, in another embodiment only a section or sections of laths 22 may be transparent or translucent. It is appreciated that the number and degree to which laths 22 are transparent or translucent along with their location on the roll-up cover may vary. Additionally, nontransparent or translucent slats may be employed adjacent transparent or translucent slats on the cover.

Accessory Track and Water Management

Figure 3:
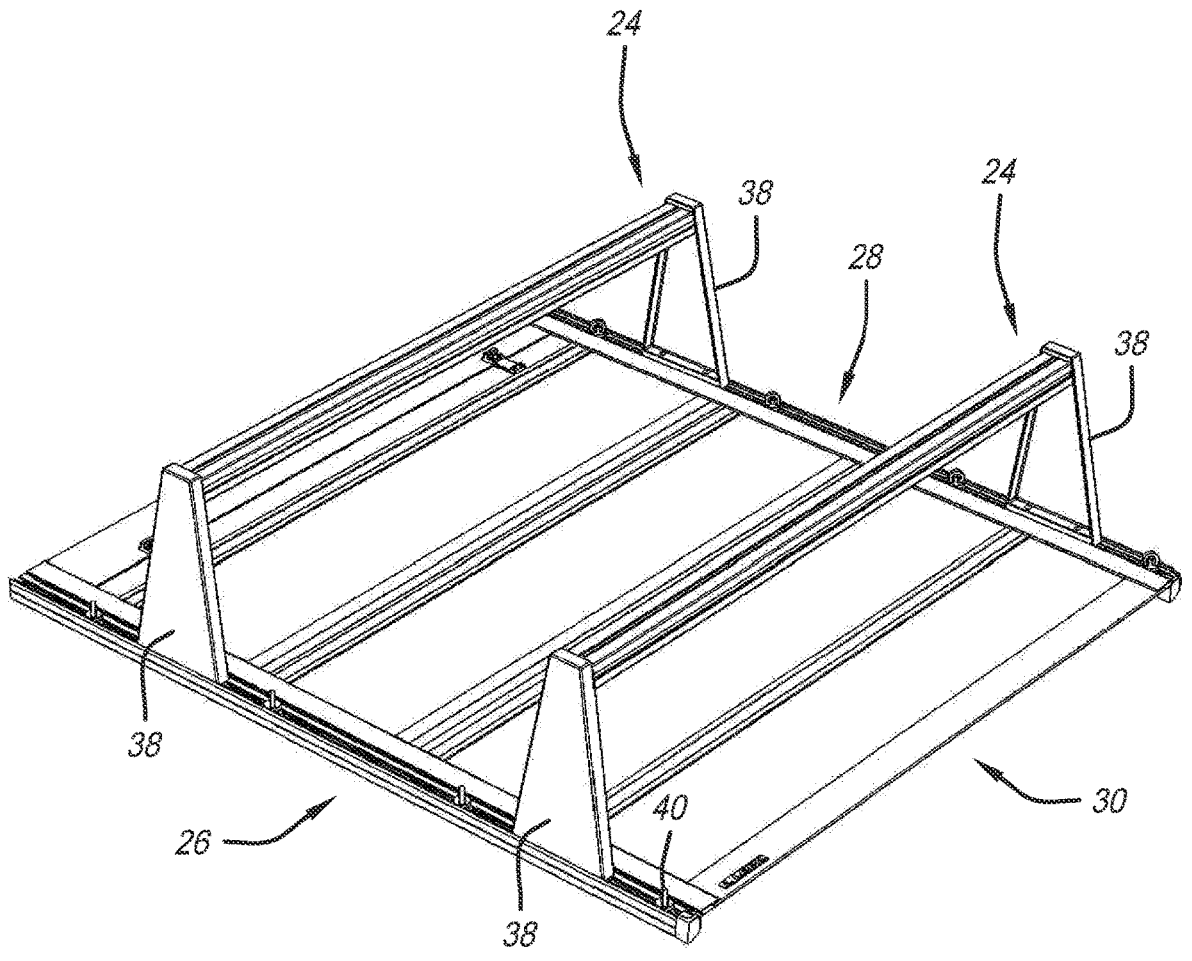
FIG. 3 is a perspective view of another illustrative embodiment of the tonneau cover that includes accessory rail tracks.

Another illustrative embodiment provides a tonneau cover rail that includes an accessory track formed therein. Racks 24, such as those shown in FIGS. 1 and 3, may be selectively positioned and movable within accessory rail tracks 26 and 28. Each of accessory rail tracks 26 and 28 includes a rail portion 32 to engage tonneau cover 30 and a track portion 34 to receive accessories, such as rack 24, for example. Additionally, accessory rail tracks 26 and 28 may serve as a water management tool. Water may collect in the tracks to be diverted away from the cover.

Figure 4:
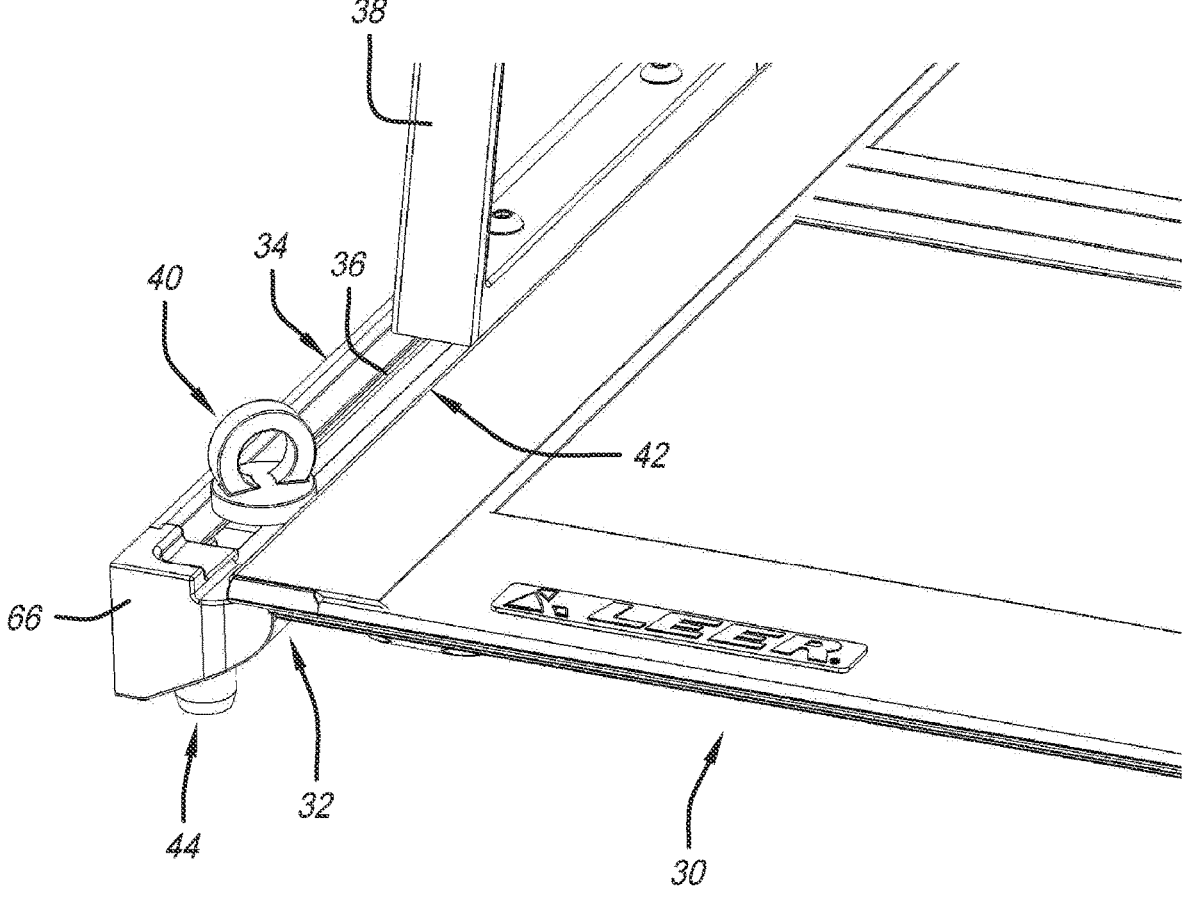
FIG. 4 is a detail perspective view of a portion of the tonneau cover and rail with the accessory rail track.

A perspective detail view of a portion of tonneau cover 30 and accessory rail track 26 are shown in FIG. 4. This view shows tonneau cover 30 located on rail portion 32 leaving track portion 34 exposed adjacent tonneau cover 30. A longitudinally extending channel 36 is located in track portion 34. Such track portion 34 may receive uprights 38 of racks 24, eye-bolt accessory tie downs 40, as well as additional accessories. Because side edge 42 of tonneau cover 30 does not extend over track portion 34, there is no obstruction to channel 36. This allows any number of accessories and mounts to be attached to track portion 34 while at the same time allowing normal operation of tonneau cover 30 to cover and uncover the cargo box. These eye-bolts 40 may be located periodically along each of the accessory rail tracks 26 and 28 to provide tie down points for ropes and bungee cords (see, also, FIG. 3). Also shown in this view is a drain port 44 that extends downward from channel 36. This allows any water from rain etc. that may collect in channel 36 to drain therefrom, away from track portion 34.

Figure 5:
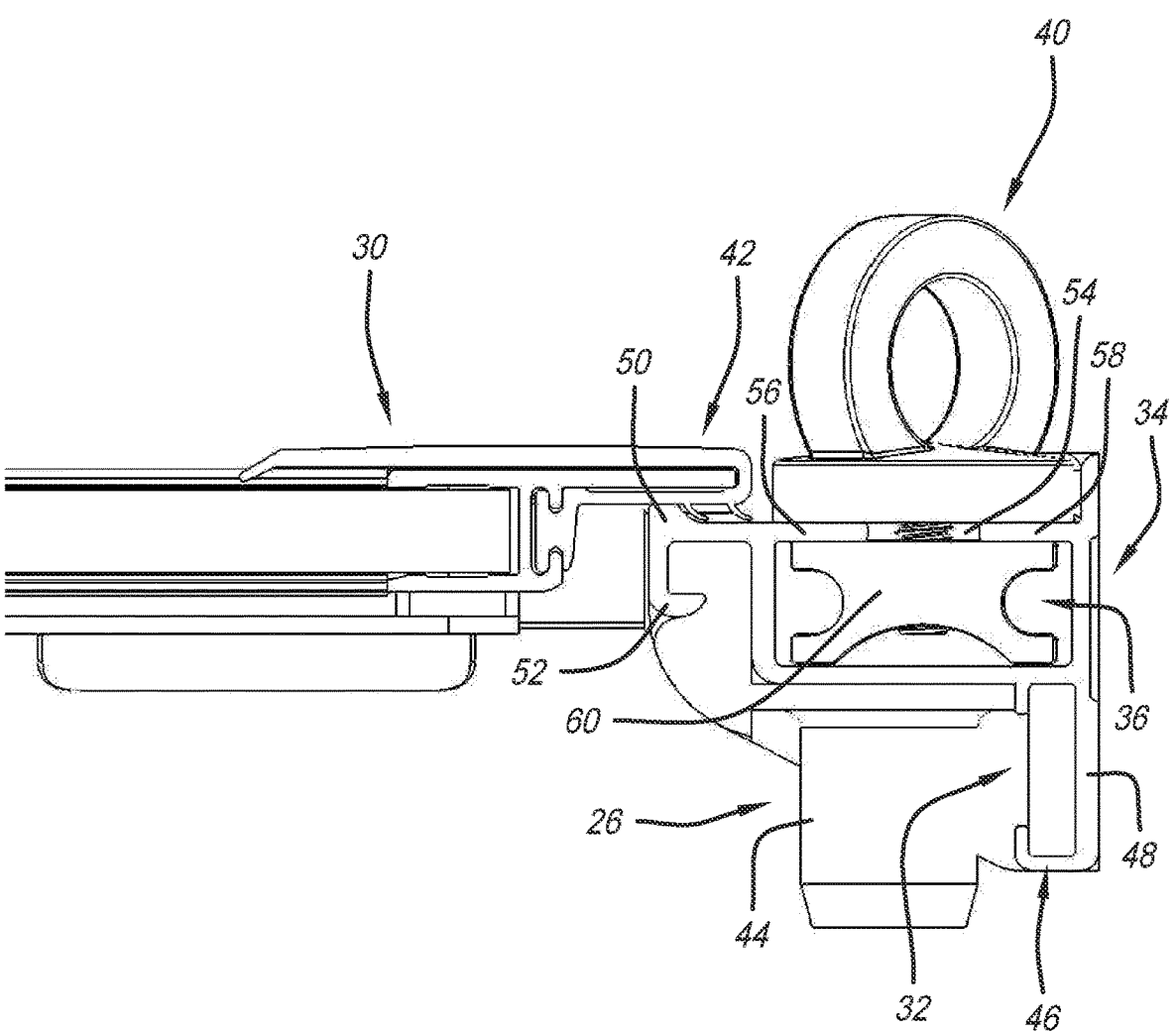
FIG. 5 is a rearward looking end sectional detail view of a portion of the tonneau cover with the rail and accessory rail track.

A rearward looking end sectional detail view of a portion of tonneau cover 30 and accessory rail track 26 is shown in FIG. 5. This view depicts the configuration of rail portion 32 and track portion 34 as part of accessory rail track 26 (as well as accessory rail track 28 on the other side of tonneau cover 30). Rail portion 32, illustratively, includes a clamp channel 46 that receives a clamp assembly for purposes of attaching accessory rail tracks 26 and 28 to their respective cargo box sidewalls.

Clamp channel 46 is partially formed by clamp panel 48 that extends upwardly to track portion 34. Another part of rail portion 32, however, is cover ledge 50 extending from track portion 34. In this illustrative embodiment, side edge 42 of tonneau cover 30 may rest on cover ledge 50 keeping it from interfering with track portion 34. In the illustrated embodiment, tonneau cover 30 does not obstructively sit on top of track portion 34. A latch edge 52 may extend from cover ledge 50, as illustratively shown, to be available to engage a latch to secure tonneau cover 30 to accessory rail tracks 26 and 28, thereby being secured to the cargo box by virtue of accessory rail tracks 26 and 28 being clamped to same.

Track portion 34 of each of accessory rail tracks 26 and 28 include channel 36 which opens up to slot 54 formed between opposing track surfaces 56 and 58. This view depicts how the eye-bolt 40 is secured to track portion 34 via a securement block 60 located within channel 36. Illustratively, a threaded fastener portion 62, of eye-bolt 40, extends through a corresponding threaded bore (not shown) in securement block 60. A threaded fastener portion 62 extends through slot 54 and threads into a corresponding threaded bore, coupling these structures to track portion 34. For example, as threaded fastener portion 62 threads further onto securement block 60, track surfaces 56 and 58, on each side of slot 54, are sandwiched between securement block 60 and eye-bolt 40. Because track surfaces 56 and 58 are part of the overall accessory rail track, such accessory as eye-bolt 40 securing to track surfaces 56 and 58 means it is secured to, in this case, accessory rail track 26. Loosening threaded fastener portion 62 of eye-bolt 40 allows the same (with securement block 60) to move along channel 36 to any location. Tightening threaded fastener portion 62 of eye-bolt 40 allows same to be secured at that location along channel 36.

A skilled artisan, upon reading this disclosure, will appreciate that other accessories like upright 38 (see FIGS. 3 and 4), may be secured to track portion 34 using a similar-type fastener/securement block configuration to sandwich track surfaces 56 and 58 between the block and the accessory, thereby securing same to track portion 34.

This view also shows drain port 44 directed downward from accessory rail track 26. It is appreciated that drain port 44 is in fluid communication with channel 36 (see, also, FIG. 6). Water that may enter channel 36 from slot 54, for example, can exit channel 36 via drain port 44. It is further appreciated that a drain tube or the like may be coupled to the end of drain port 44 to direct water away from channel 36 and out to a predetermined location. It is still further appreciated that all of the structures discussed herein with respect to rail portion 32 and track portion 34 of accessory rail track 26 applies the same to the rail portion 32 and track portion 34 of accessory rail track 28 located on the opposite side of tonneau cover 30.

Figure 6:
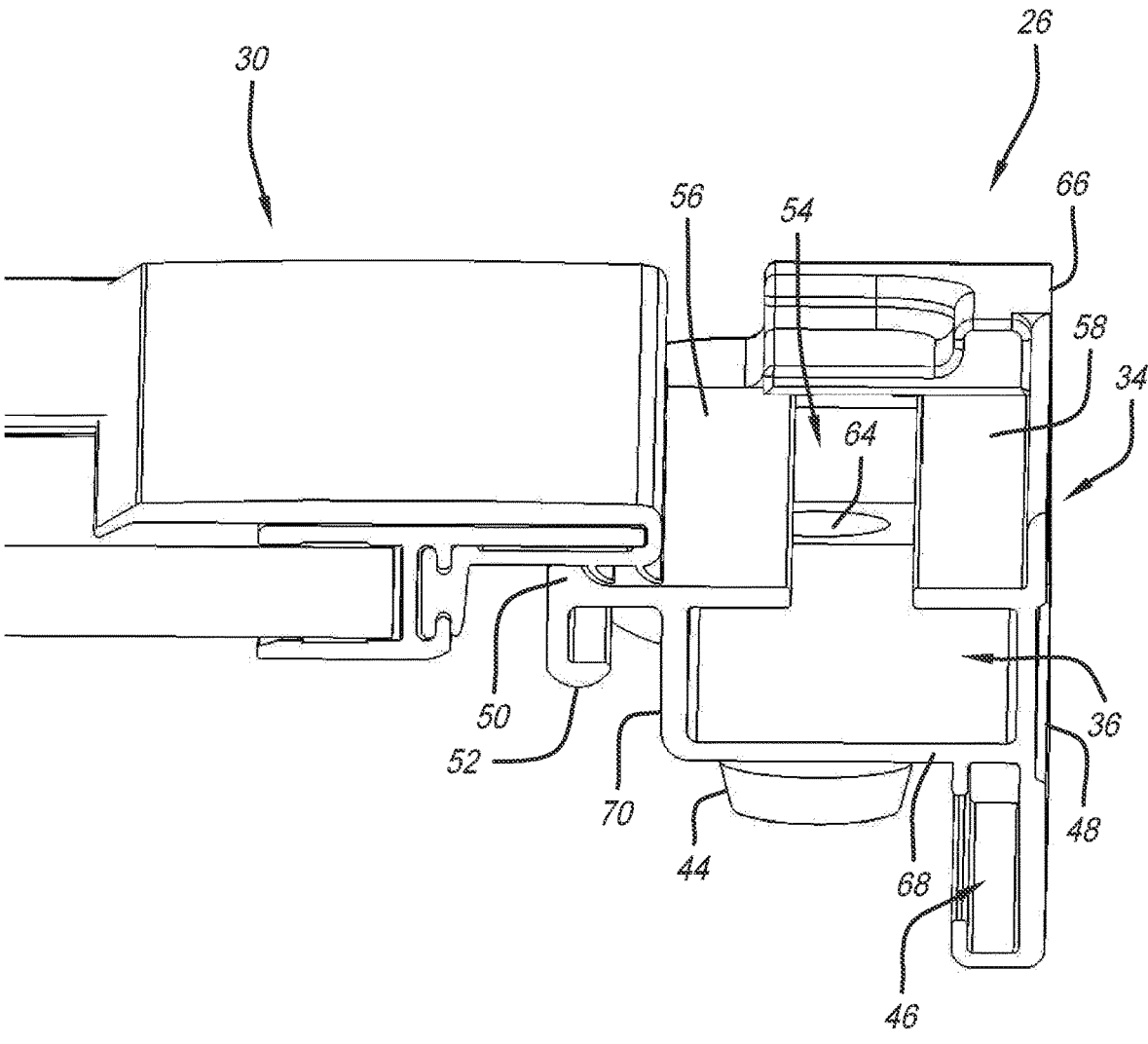
FIG. 6 is a rearward looking top end sectional perspective detail view of a portion of the tonneau cover, rail, and accessory rail track.

A top perspective rearward looking end detail view of accessory rail track 26, showing channel 36 within track portion 34 spaced from tonneau cover 30, is shown in FIG. 6. This view has eye-bolt 40 removed making drain opening 64, which provides fluid communication between channel 36 and drain port 44, apparent. It is appreciated that the accessory rail tracks 26 and 28 may be extruded components. Thus, drain port 44 with drain opening 64 may be part of an end cap 66 attached to the rearward edge of accessory rail tracks 26 and 28 (see, also, FIG. 4). Such end cap 66 provides not only additional water management for accessory rail tracks 26 and 28, but also provides an aesthetically more appealing finished end of same.

The view in FIG. 6 further shows clamp channel 46 extending from clamp panel 48 under track portion 34. As shown, cover ledge 50 and latch edge 52 extends from track surface 56 located adjacent slot 54 and opposing track surface 58. It is appreciated that channel 36 may extend along the entire length or a portion of accessory rail tracks 26 and 28. This profile of track portion 34 further demonstrates how channel 36 is formed of a channel web 68 located between a portion of clamp panel 48 on one side and an opposing side panel 70. Thus, in this embodiment, channel 36 is illustratively a U-shaped channel with longitudinally extending slot 54 bounded by longitudinally extending track surfaces 56 and 58 creating the open end of channel 36.

Figure 7:
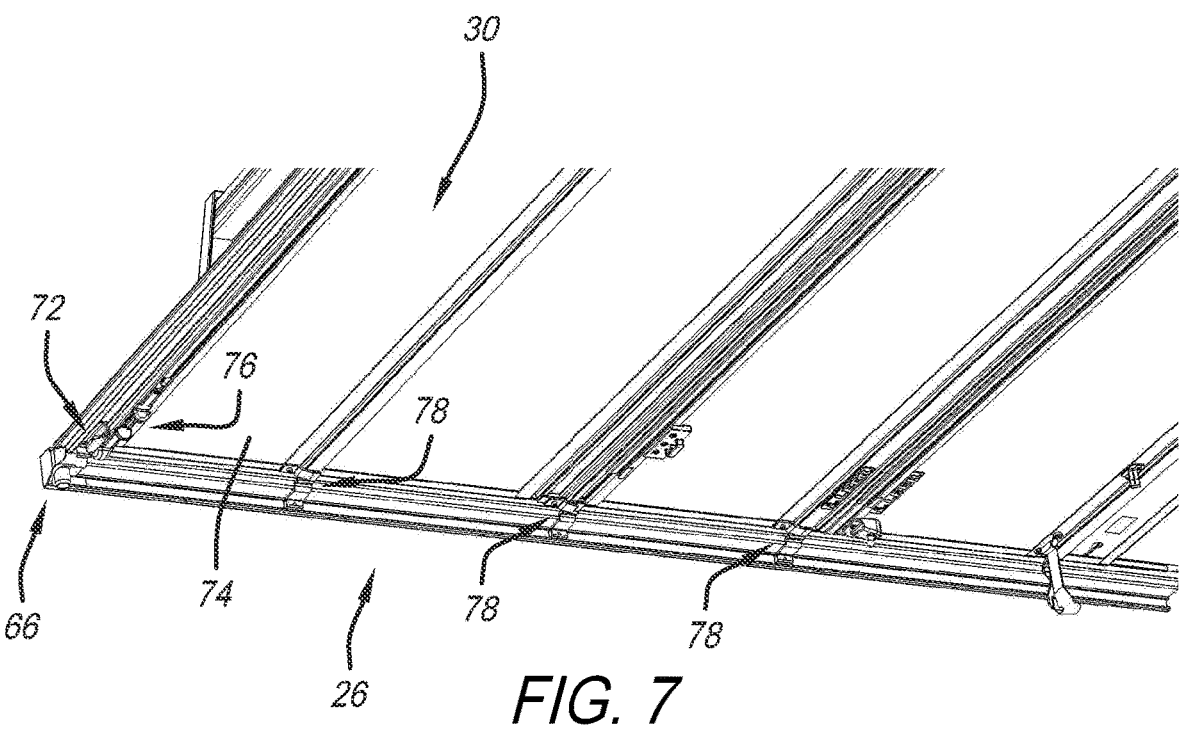
FIG. 7 is an underside perspective view of a tonneau cover secured to the rail.

An underside perspective view of tonneau cover 30 secured to accessory rail track 26 is shown in FIG. 7. Here, a latch assembly 72 is located adjacent the rear of the first panel section 74. A release mechanism 76 moves latch 80 (see FIG. 8) away from the accessory rail track 26 to release first panel 74. Hook and tab assemblies 78 are located adjacent the front ends of the panels attached to accessory rail track 26. Also shown is end cap 66 coupled to the end of accessory rail track 26.

Figure 8:
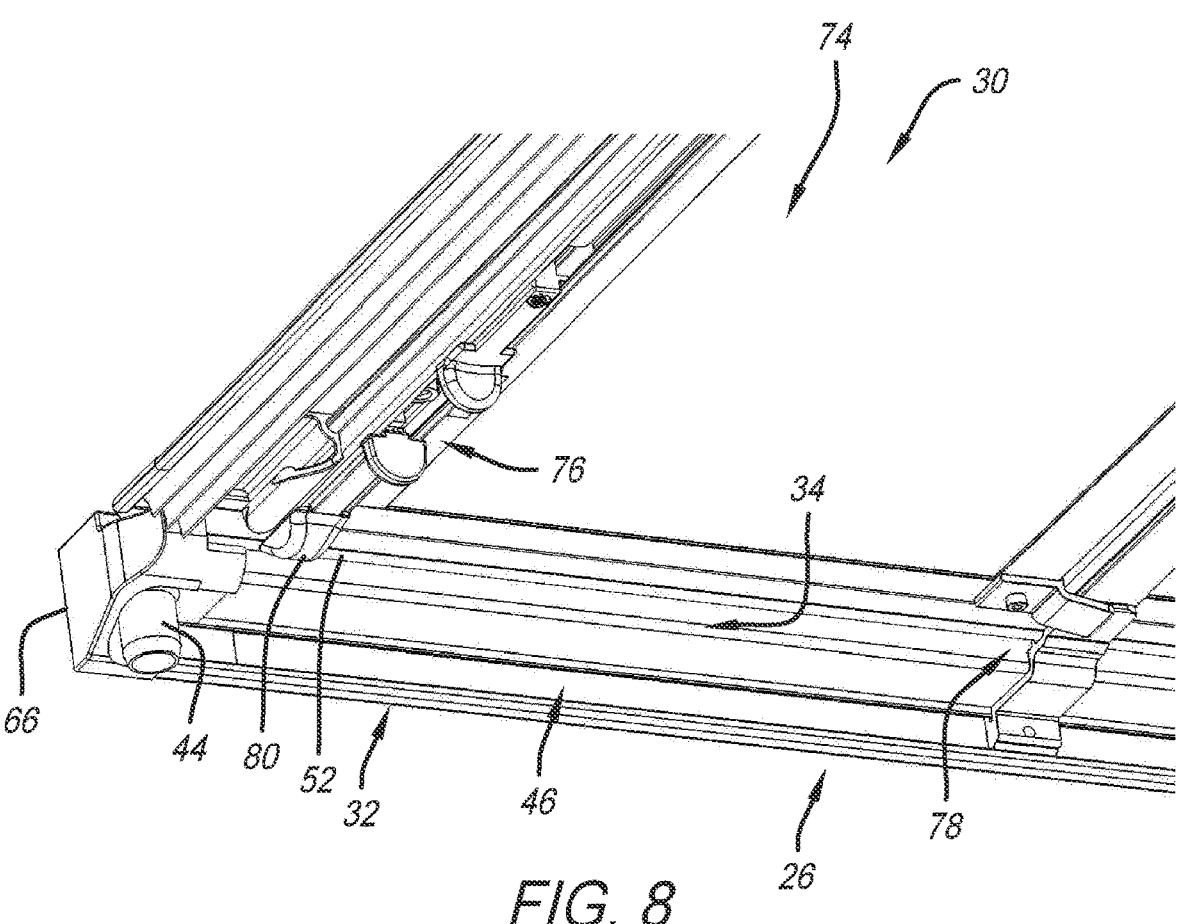
FIG. 8 is an underside detail view of a portion of the tonneau cover secured to the rail from FIG. 7.

A detail underside perspective view of tonneau cover 30, secured to accessory rail track 26, is shown in FIG. 8. This view further shows latch 80 engaging latch edge 52 on accessory rail track 26. This keeps tonneau cover 30 and, particularly, panel section 74, latched to accessory rail track 26 until latch 80 is removed. It is appreciated that a similar latch engages latch edge 52 to secure that side of panel section 74 to accessory rail track 28. This view also depicts how rail portion 32 and track portion 34 of accessory rail track 26 (as well as 28) are longitudinally extending.

Roll-Up Cover

Another illustrative embodiment includes a roll-up tonneau cover. This tonneau cover, operates similar to a bread box where pivotally connected thin panels, slats, or laths unroll outward along a track or rail to cover the cargo box. They conversely roll up in the opposite direction into a container or canister to uncover the cargo box. In the illustrated embodiment, the top surfaces of the panels, slats, or laths, roll up into the canister facing a drum or the center of the canister.

Figure 9:
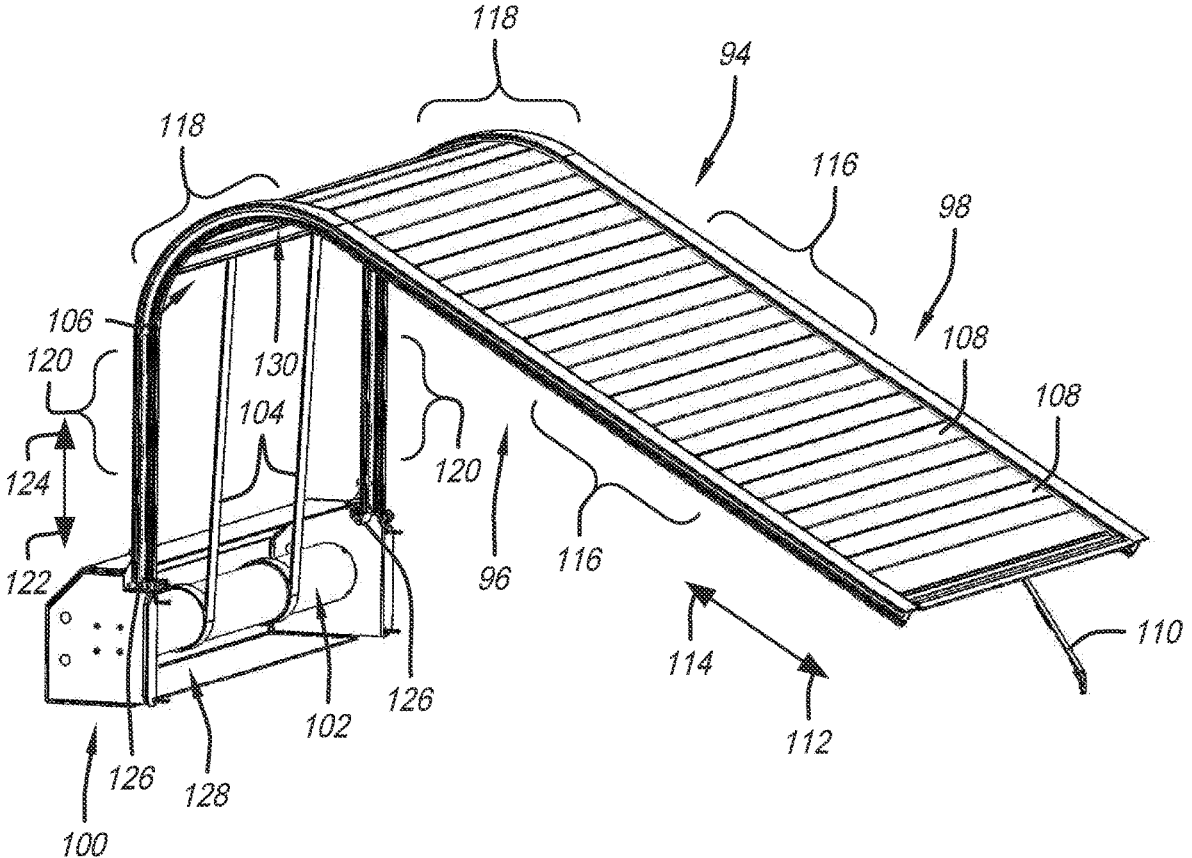
FIG. 9 is a perspective view of a roll-up cover with rails attached to a canister with a rolling drum.
Figure 10:
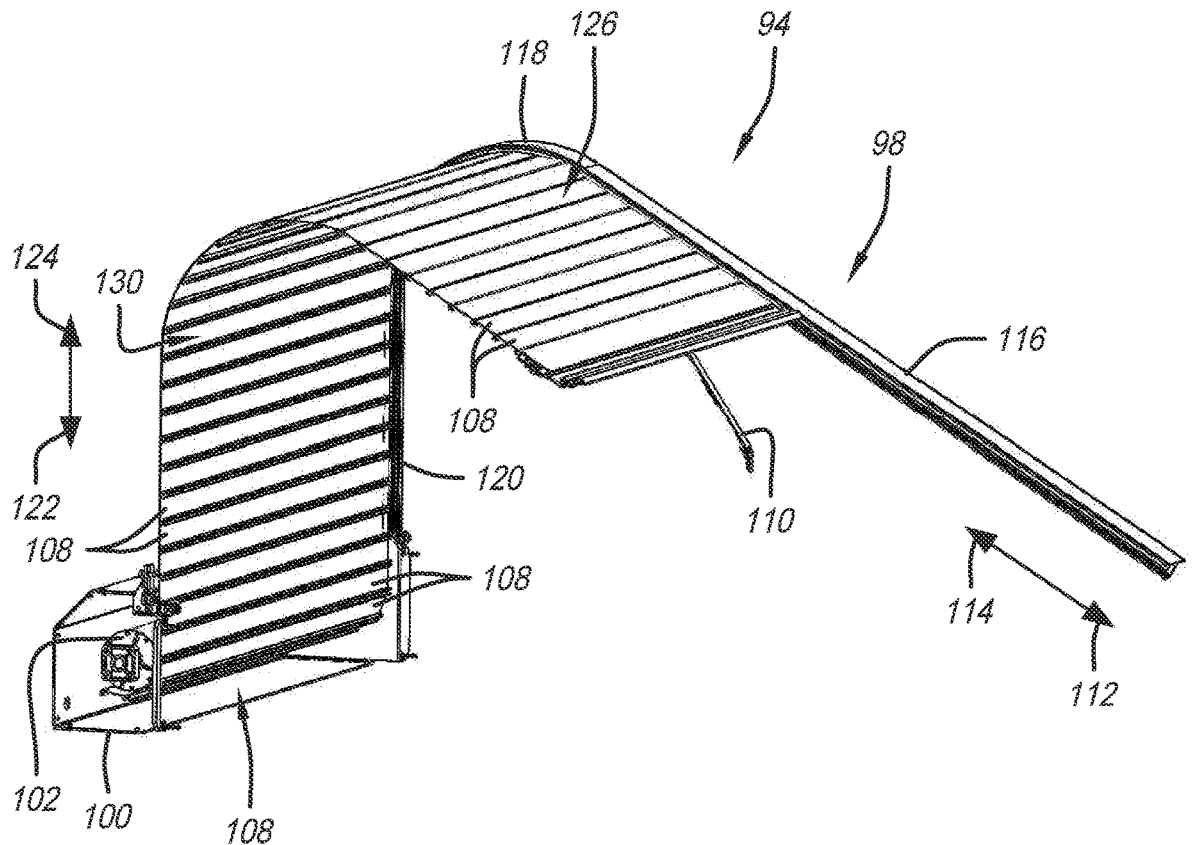
FIG. 10 is another perspective view of a roll-up cover with rails attached to the canister with the rolling drum.

A perspective view of a roll-up tonneau cover 94, with rails 96 and 98 attached to a canister 100, having a rolling drum 102 therein, is shown in FIG. 9. One or more straps 104 are attached to both front end 106 of roll-up tonneau cover 94 and drum 102. Typical roll-up tonneau covers that roll-up into a canister, follow a linear path directly into the canister that is located up at the top opening of the cargo box adjacent the bulkhead (and cab end of the truck). In contrast, the roll-up tonneau cover of the present disclosure has its canister located adjacent the floor of the cargo box. Each of rails 96 and 98 include a linear section 116, so when laths 108 are moved in direction 112, by pulling on pull cord 110, they shroud the open end of the cargo box. Linear section 116 follows a generally straight path commensurate with the top surface of the sidewalls of the cargo box for covering and uncovering same. When laths 108 are moved in direction 114 to uncover the cargo box, they move to the next section adjacent linear section 116—arcuate section 118. Here, as shown in FIGS. 9 and 10, laths 108 begin changing direction from the straight path of linear section 116. Instead of laths being gathered in a canister at the end of linear section 116 at the top bulkhead end of the cargo box, they instead turn following the curved shape of arcuate section 118. This moves laths 108 into the cargo box.

Following the path of travel of laths 108 from linear section 116 and arcuate section 118, they then move downward into the cargo box, along descending section 120 of rails 96 and 98. Descending section 120 of rails 96 and 98 are oriented transverse to linear section 116. Descending section 120 of rails 96 and 98 also leads to canister 100. When drum 102 is rolled, straps 104 pull on laths 108 at end 106 moving same in direction 122. Laths 108 roll-up onto drum 102 in a stowed position, thereby opening the cargo box.

It is appreciated that ends 126 of descending section 120 of rails 96 and 98 are in communication with opening 128 of canister 100 for purposes of receiving laths 108 so roll-up tonneau cover 94 is in an open position with respect to the cargo box. This allows for more access to the top open space of the cargo box. The canister, such as canister 100, is no longer occupying the top front bulkhead end of the cargo box.

Conversely, laths 108 may be pulled in direction 124, as well as linear direction 112, in order to move them back over the cargo box. This means laths 108 are moved over the cargo box to a closed position. This can be accomplished by pulling on pull cord 110 to move laths 108 in direction 112.

Another perspective view of the roll-up tonneau cover 94, of FIG. 11, is shown in FIG. 12. Here, roll-up tonneau cover 94 moves in direction 114 and then in direction 122, shown to be rolled up around the drum 102 inside canister 100. Another aspect of this disclosure is that in contrast to conventional roll-up tonneau covers, here, laths 108 roll around drum 102 so that their top surfaces 126 face inwardly towards drum 102 and the underside 130 of laths 108 face away from drum 102. Additionally, tonneau cover 94 wraps around drum 102 from the underside of drum 102 as shown in FIG. 10, rather than over top of drum 102.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that any subject matter disclosed in this non-provisional patent application that may differ from the priority application, then the disclosure from this non-provisional patent application controls.

What is claimed:

1. A tonneau cover comprising:
a cover that selectively shrouds at least a portion of a cargo box opening;
wherein the cover includes:
at least one panel section that is configured to extend over the cargo box opening;
wherein the at least one panel section is movable with respect to the cargo box opening;
wherein the at least one panel section includes a lath;
wherein the lath is a rigid body and extends from about one sidewall of cargo box of a pickup truck to about an opposed side wall of the cargo box; and
wherein the lath of the at least one panel section is composed entirely of a material that allows light to pass through.

2. The tonneau cover of claim 1, wherein the lath that allows light to pass through is transparent or translucent.

3. The tonneau cover of claim 1, wherein the lath that allows light to pass through is transparent.

4. The tonneau cover of claim 1, wherein the lath that allows light to pass through is translucent.

5. The tonneau cover of claim 1, wherein multiple panel sections, each with a lath, wherein the entirety of the lath is composed of a material that allows light to pass through.

6. The tonneau cover of claim 1, wherein the cover is a fold-up cover.

7. The tonneau cover of claim 1, wherein the cover is a roll-up cover.

8. The tonneau cover of claim 1, wherein the at least one panel section is a single panel.

9. The tonneau cover of claim 1, wherein the lath of the at least one panel section is composed of a polycarbonate that allows light to pass through.

10. The tonneau cover of claim 1, wherein the lath of the at least one panel section is composed of a plastic that allows light to pass through.

11. The tonneau cover of claim 1, wherein the at least a portion of the generally planar body of the at least one panel section does not include a honeycomb core.

12. A tonneau cover comprising:
a cover that selectively shrouds at least a portion of a cargo box opening;
wherein the cover includes:
at least one panel section that is configured to extend over the cargo box opening;
wherein the at least one panel section is movable with respect to the cargo box opening;
wherein the at least one panel section includes a lath;
wherein the lath is a rigid body and extends from about one sidewall of cargo box of a pickup truck to about an opposed side wall of the cargo box; and
wherein the lath of the at least one panel section is transparent.

13. The tonneau cover of claim 12, wherein the cover is selected from the group consisting of a fold-up cover, a roll-up cover, and the at least one panel section being a single panel.

14. The tonneau cover of claim 12, wherein the lath of the at least one panel section is composed entirely of a polycarbonate.

15. The tonneau cover of claim 12, wherein the lath of the at least one panel section is composed of a polymer.

16. A tonneau cover comprising:
a cover that selectively shrouds at least a portion of a cargo box opening;
wherein the cover includes:
at least one panel section that is configured to extend over the cargo box opening;
wherein the at least one panel section is movable with respect to the cargo box opening;
wherein the at least one panel section includes a lath;
wherein the lath is a rigid body and extends from about one sidewall of cargo box of a pickup truck to about an opposed side wall of the cargo box; and
wherein the lath of the at least one panel section is at least translucent.

17. The tonneau cover of claim 16, wherein the cover is selected from the group consisting of a fold-up cover, a roll-up cover, and the at least one panel section being a single panel.

18. The tonneau cover of claim 16, wherein the lath of the at least one panel section is composed of a polycarbonate.

* * * * *